(12) United States Patent
Keese et al.

(10) Patent No.: US 7,278,350 B2
(45) Date of Patent: Oct. 9, 2007

(54) BELTS WITH INTEGRAL FLIGHTS FOR USE IN HIGH-TEMPERATURE FOOD PROCESSING EQUIPMENT AND SYSTEMS INCLUDING SUCH BELTS

(75) Inventors: Frank M. Keese, Cambridge, NY (US); Kevin C. Bauler, Naperville, IL (US); Gerard T. Buss, Bedford, NH (US); John A. Effenberger, Bedford, NH (US)

(73) Assignee: Saint-Gobain Performance Plastics, Wayne, NJ (US)

( * ) Notice: Subject to any disclaimer, the term of this patent is extended or adjusted under 35 U.S.C. 154(b) by 9 days.

(21) Appl. No.: 10/796,534

(22) Filed: Mar. 9, 2004

(65) Prior Publication Data
US 2004/0154473 A1   Aug. 12, 2004

Related U.S. Application Data

(62) Division of application No. 09/608,649, filed on Jun. 30, 2000, now Pat. No. 6,919,122.

(60) Provisional application No. 60/142,758, filed on Jul. 8, 1999.

(51) Int. Cl.
*A47J 37/00*   (2006.01)
*A47J 37/04*   (2006.01)
*A23L 1/00*    (2006.01)

(52) U.S. Cl. ............. 99/386; 99/349; 99/372; 99/373; 99/385; 99/443 C; 219/388

(58) Field of Classification Search ............ 474/237, 474/242, 251, 266; 74/89.1; 198/461.3, 198/606, 626.2, 688.1, 690.2, 699.1, 844.1; 99/349, 372, 373, 385, 386, 329 RT, 443 C; 428/156, 172; 219/388
See application file for complete search history.

(56) References Cited

U.S. PATENT DOCUMENTS 810,510 A   1/1906   Robins, Jr.

(Continued)

FOREIGN PATENT DOCUMENTS

CA   2326099   10/1999

(Continued)

OTHER PUBLICATIONS

Letter from Carponelli & Krug, 230 West Monroe Street, Suite 250, Chicago, IL, 60606, dated Jan. 14, 2004, regarding Pending European Patent Application EP 1-067-065 AZ.

(Continued)

*Primary Examiner*—Donald J. Loney
(74) *Attorney, Agent, or Firm*—Foley & Lardner LLP

(57) ABSTRACT

A flexible composite with integral flights is provided and methods for making the same. The composite is made from, for example, silicone rubber, urethane rubber, polytetrafluoroethylene or other polymer. The composites are useful for making conveyor belts for use in high temperature food processing, and particularly for contact toasters. The conveyor belts are an improvement over the prior art in that they prevent slippage of the articles conveyed, may be manufactured at low cost, and are relatively easy to clean.

49 Claims, 4 Drawing Sheets

U.S. PATENT DOCUMENTS

| | | | |
|---|---|---|---|
| 1,580,075 A | 4/1926 | Paine | |
| 2,305,044 A | 12/1942 | Toews | |
| 2,430,500 A | 11/1947 | Freedlander et al. | |
| 2,514,429 A | 7/1950 | Waugh | |
| 2,858,237 A | 10/1958 | Walles et al. | |
| 3,109,202 A | 11/1963 | Beckadolph et al. | |
| 3,123,354 A | 3/1964 | Ungerer | |
| 3,156,128 A | 11/1964 | Williams | |
| 3,222,237 A | 12/1965 | McKelvy | |
| 3,262,383 A * | 7/1966 | Sturman | 99/386 |
| 3,280,847 A | 10/1966 | Chisholm et al. | |
| 3,329,256 A | 7/1967 | Elgaway | |
| 3,374,751 A | 3/1968 | Werner | |
| 3,646,880 A * | 3/1972 | Norris | 99/349 |
| 3,659,517 A | 5/1972 | Holen | |
| 3,772,929 A | 11/1973 | Redmond, Jr. | |
| 3,933,548 A | 1/1976 | Anderson, Jr. et al. | |
| 3,936,554 A | 2/1976 | Squier | |
| 3,949,733 A | 4/1976 | Miller et al. | |
| 3,958,531 A | 5/1976 | Warne | |
| 3,959,434 A | 5/1976 | Squier | |
| 3,961,569 A | 6/1976 | Kenyon et al. | |
| 3,967,720 A | 7/1976 | Arieh | |
| 3,976,370 A | 8/1976 | Goel et al. | |
| 3,977,265 A | 8/1976 | Worley et al. | |
| 3,988,940 A | 11/1976 | Szonn et al. | |
| 3,988,941 A | 11/1976 | Smith | |
| 4,000,348 A | 12/1976 | Harlow | |
| 4,011,766 A | 3/1977 | Waugh | |
| 4,053,547 A | 10/1977 | Redmond, Jr. | |
| 4,077,935 A | 3/1978 | Wszolek | |
| 4,084,030 A | 4/1978 | Goodale et al. | |
| 4,104,985 A | 8/1978 | Klein | |
| 4,128,369 A | 12/1978 | Kemerer et al. | |
| 4,143,759 A | 3/1979 | Paradis | |
| 4,148,864 A | 4/1979 | Groth et al. | |
| 4,151,755 A | 5/1979 | Allaben, Jr. | |
| 4,162,727 A | 7/1979 | Summers | |
| 4,184,589 A | 1/1980 | Habegger | |
| 4,194,026 A | 3/1980 | Goodale et al. | |
| 4,211,743 A | 7/1980 | Nauta et al. | |
| 4,216,679 A | 8/1980 | Howerton et al. | |
| 4,219,617 A | 8/1980 | Wallshein | |
| 4,261,257 A * | 4/1981 | Henderson et al. | 99/386 |
| 4,284,348 A | 8/1981 | Graswinckel | |
| 4,286,870 A | 9/1981 | Silverberg | |
| 4,290,248 A | 9/1981 | Kemerer et al. | |
| 4,291,617 A | 9/1981 | Miller et al. | |
| 4,294,539 A | 10/1981 | Spehrley, Jr. | |
| 4,305,713 A | 12/1981 | Imamura | |
| 4,311,474 A | 1/1982 | Standley | |
| 4,316,536 A | 2/1982 | Verbeek | |
| 4,325,478 A | 4/1982 | Richard | |
| 4,330,287 A | 5/1982 | Fischer | |
| 4,332,576 A | 6/1982 | Stecklein et al. | |
| 4,336,021 A | 6/1982 | Haines | |
| 4,386,558 A * | 6/1983 | Holman et al. | 99/386 |
| 4,410,314 A | 10/1983 | Miranti, Jr. et al. | |
| 4,426,340 A | 1/1984 | Goller et al. | |
| 4,444,094 A | 4/1984 | Baker et al. | |
| 4,452,132 A | 6/1984 | Miller et al. | |
| 4,465,701 A | 8/1984 | Holman et al. | |
| 4,485,912 A | 12/1984 | Carmichael et al. | |
| 4,488,480 A | 12/1984 | Miller et al. | |
| 4,491,065 A | 1/1985 | Poulson | |
| 4,502,586 A | 3/1985 | Dusel et al. | |
| 4,516,485 A | 5/1985 | Miller | |
| 4,523,520 A | 6/1985 | Hofmann et al. | |
| D279,854 S | 7/1985 | Miller et al. | |
| 4,530,276 A * | 7/1985 | Miller | 99/386 |
| 4,551,297 A | 11/1985 | BoHugo et al. | |
| 4,555,543 A | 11/1985 | Effenberger et al. | |
| 4,561,348 A | 12/1985 | Halters et al. | |
| 4,616,562 A | 10/1986 | Kuechler | |
| 4,617,908 A | 10/1986 | Miller et al. | |
| 4,642,042 A | 2/1987 | Smith | |
| 4,701,340 A | 10/1987 | Bratton et al. | |
| 4,720,005 A | 1/1988 | Beresinsky | |
| 4,752,282 A | 6/1988 | Habegger et al. | |
| 4,754,868 A | 7/1988 | Hughes et al. | |
| 4,767,389 A | 8/1988 | Habegger et al. | |
| 4,770,927 A | 9/1988 | Effenberger et al. | |
| 4,798,566 A | 1/1989 | Sedlacek | |
| 4,800,865 A | 1/1989 | Setzer | |
| 4,829,158 A | 5/1989 | Burnham | |
| 4,899,872 A | 2/1990 | Hokao | |
| 4,922,304 A | 5/1990 | Gilbert et al. | |
| 4,943,473 A | 7/1990 | Sahatjian et al. | |
| 4,951,648 A | 8/1990 | Shukla et al. | |
| 4,957,199 A | 9/1990 | Wokke et al. | |
| 4,962,694 A | 10/1990 | Graver | |
| 5,001,970 A | 3/1991 | Graver | |
| 5,007,884 A | 4/1991 | Masuda et al. | |
| 5,044,264 A * | 9/1991 | Forney | 99/349 |
| 5,061,430 A | 10/1991 | Lang | |
| 5,066,352 A | 11/1991 | Albers et al. | |
| 5,094,791 A | 3/1992 | Nopper | |
| 5,135,136 A | 8/1992 | Moone | |
| 5,141,800 A | 8/1992 | Effenberger et al. | |
| 5,142,125 A | 8/1992 | Fioroli et al. | |
| 5,145,626 A | 9/1992 | Bastioli et al. | |
| 5,194,335 A | 3/1993 | Effenberger et al. | |
| 5,230,937 A | 7/1993 | Effenberger et al. | |
| 5,238,748 A | 8/1993 | Effenberger et al. | |
| 5,239,926 A | 8/1993 | Nubson et al. | |
| 5,246,099 A | 9/1993 | Genovese | |
| 5,277,104 A | 1/1994 | Colaner | |
| 5,314,072 A | 5/1994 | Frankel | |
| 5,316,462 A | 5/1994 | Seemann et al. | |
| 5,349,424 A | 9/1994 | Dalal et al. | |
| 5,357,726 A | 10/1994 | Effenberger et al. | |
| 5,392,107 A | 2/1995 | Paxon et al. | |
| 5,410,951 A * | 5/1995 | Ledet et al. | 99/443 C |
| 5,411,779 A | 5/1995 | Nakajima et al. | |
| 5,421,450 A | 6/1995 | Kitagawa et al. | |
| 5,422,458 A | 6/1995 | Simmel | |
| 5,451,744 A | 9/1995 | Koopman et al. | |
| 5,458,051 A * | 10/1995 | Alden et al. | 99/349 |
| 5,458,477 A | 10/1995 | Kemerer et al. | |
| 5,473,975 A | 12/1995 | Bruno et al. | |
| 5,573,716 A | 11/1996 | Jacobson | |
| 5,588,354 A | 12/1996 | Stuck et al. | |
| 5,610,217 A | 3/1997 | Yarnell et al. | |
| 5,657,853 A | 8/1997 | Pennino | |
| 5,667,610 A | 9/1997 | Yoshida et al. | |
| 5,673,610 A | 10/1997 | Stuck | |
| 5,686,004 A | 11/1997 | Schneider | |
| 5,725,427 A | 3/1998 | Koerber | |
| 5,746,116 A | 5/1998 | Smith | |
| 5,759,924 A | 6/1998 | Sahlin | |
| 5,778,294 A | 7/1998 | Hiraoka et al. | |
| 5,787,655 A | 8/1998 | Saylor, Jr. | |
| 5,801,362 A | 9/1998 | Pearlman et al. | |
| 5,820,726 A | 10/1998 | Yoshida et al. | |
| 5,830,248 A | 11/1998 | Christianson et al. | |
| 5,880,043 A | 3/1999 | Lorenz et al. | |
| 5,897,818 A | 4/1999 | Lewit et al. | |
| 5,904,954 A | 5/1999 | Cassat et al. | |
| 5,904,972 A | 5/1999 | Tunis, III et al. | |
| 5,916,354 A | 6/1999 | Dragt | |
| 5,916,659 A | 6/1999 | Koerber et al. | |
| 5,931,083 A | 8/1999 | Stanger et al. | |
| 5,931,983 A | 8/1999 | Bloom | |
| 5,935,376 A | 8/1999 | Fell | |

| | | | |
|---|---|---|---|
| 5,960,704 | A | 10/1999 | March et al. |
| 6,035,765 | A | 3/2000 | Finck |
| 6,059,655 | A | 5/2000 | Koerber |
| 6,139,426 | A | 10/2000 | Koerber |
| 6,153,244 | A | 11/2000 | Stanger et al. |
| 6,177,654 | B1 | 1/2001 | Schackmuth |
| 6,180,210 | B1 | 1/2001 | Debus |
| 6,194,050 | B1 | 2/2001 | Koerber et al. |
| 6,239,223 | B1 | 5/2001 | Effenberger et al. |
| 6,241,076 | B1* | 6/2001 | Maguire ............... 198/626.1 |
| 6,252,201 | B1 | 6/2001 | Nevarez |
| 6,294,600 | B1 | 9/2001 | Takada |
| 6,352,758 | B1 | 3/2002 | Huang et al. |
| 6,399,678 | B2 | 6/2002 | Frankoski et al. |
| 6,495,182 | B1 | 12/2002 | Stuck |
| 6,516,943 | B2 | 2/2003 | Engle et al. |
| 6,546,836 | B1 | 4/2003 | Denney et al. |
| 6,616,558 | B2 | 9/2003 | South |
| 6,695,135 | B1 | 2/2004 | Lapeyre |
| 6,904,615 | B2 | 6/2005 | Kobe et al. |
| 2004/0048708 | A1 | 3/2004 | Nonnast et al. |
| 2005/0097824 | A1 | 5/2005 | Braunschweig et al. |

FOREIGN PATENT DOCUMENTS

| | | |
|---|---|---|
| EP | 1 067 065 A2 | 1/2001 |
| GB | 310394 | 4/1929 |
| GB | 1020624 | 2/1966 |
| GB | 1 279 581 | 6/1972 |
| GB | 1 402 275 | 8/1975 |
| GB | 1433204 | 4/1976 |
| GB | 1445143 | 8/1976 |
| GB | 1494218 | 12/1977 |
| JP | 2002-036361 | 2/2002 |

OTHER PUBLICATIONS

Letter from Carponelli & Krug, 230 West Monroe Street, Suite 250, Chicago, IL, 60606, dated Oct. 17, 2003, regarding Pending European Patent Application EP 1-067-065 AZ.

Letter from Carponelli & Krug, 230 West Monroe Street, Suite 250, Chicago, IL, 60606, dated Dec. 8, 2003, regarding Pending European Patent Application EP 1-067-065 AZ.

USPTO Patent Full-Text and Image Database Search Results for (ABST/(coat OR coated) AND belt) AND (((rib OR flight) OR chevron) OR cleat)), completed on Oct. 29, 2003, 10 pages.

http://www.conveyorbelt.com.com/product/fbg_customBeltChevrons.php material, dated Oct. 1, 2003, 3 pages.

http://www.beltservice.com/beltservice_corporate_id.html material, dated Oct. 1, 2003, 5 pages.

http://www.ammeraal-beltechusa.com/SpecialFabricatios.htm material, dated Oct. 2, 2003, 7 pages.

http://www.sparksbelting.com/polyurethane-belting.html material, dated Oct. 2, 2003; 2 pages.

http://www.scandura.net/product/lightweightmain.html material, dated Oct. 2, 2003, 4 pages.

http://www.chemprene.com/five.htm material, dated Oct. 2, 2003, 2 pages.

Ammerall Beltech brochure, Elastomer Conveyor Belts, dated Jan. 2002, 8 pages.

http://www.fabreeka.com/belting/products/food/fabloncleat.html material, dated Oct. 2, 2003, 3 pages.

http://www.flexco.com/products_dist/us_canada/us_products/mech_cleats/usmc_bondable_cleats material, dated Oct. 1, 2003, 4 pages.

European Patent Office Communication Pursuant to Article 96(2) EPC, dated Dec. 8, 2003, 4 pages.

European Search Report for Application No. EP 00 20 2394, dated Mar. 30, 2001, 2 pages.

Office Action for U.S. Appl. No. 09/608,649, dated Jan. 2, 2002, 4 pages.

Office Action for U.S. Appl. No. 09/608,649, dated May 17, 2002, 4 pages.

Office Action for U.S. Appl. No. 09/608,649, dated Dec. 27, 2002, 5 pages.

Office Action for U.S. Appl. No. 09/608,649, dated Apr. 21, 2004, 6 pages.

Google Patent Search for "Fluoroelastomer" or "Fluoroelastomers" or "Viton" or "Fluorel" and "chevron" et al. printed from website www.google.com on Sep. 22, 2004, 1 page.

USPTO Patent Database Search for "Silicone" or "Urethane Rubber" or "Fluoropolymer" or Fluoroplastic or Fluoroelastomer, printed from website patft.uspto.gov on Sep. 22, 2004, 2 pages.

USPTO Patent Database Search for "Silicone Rubber" or "Urethane Rubber" or "Fluoropolymer" or Fluoroplastic et al., printed from website patft.uspto.gov on Sep. 22, 2004, 2 pages.

USPTO Patent Database Search for "Silicone Rubber" or "Urethane Rubber" or "Fluoropolymer" or Fluoroplastic or Fluoroelastomer et al., printed from website patft.uspto.gov on Sep. 22, 2004, 3 pages.

Elastomer Conveyor Belts, Ammeraael Beltech, Jan. 2002, 8 pages.

F. N. Sheppard & Co. Catalog, Copyright 2000, 49 pages.

Urethane and Silicone Covers, Beltservice Corporation, printed from website www.beltservice.com on Sep. 22, 2004, 2 pages.

Light Weight Thermoplastic Belting, Beltservice Corporation, printed from website www.beltservice.com on Sep. 22, 2004, 2 pages.

Chevron Cleated Belting, Beltservice Corporation, printed from website www.beltservice.com on Sep. 22, 2004, 2 pages.

Cleated Belting, Beltservice Corporation, printed from website www.beltservice.com on Sep. 22, 2004, 2 pages.

More Conveyor Belts, J.A. Emilius & Sons, printed from website www.emilius.com on Sep. 21, 2004, 2 pages.

Light Duty Conveyor Belts, Dynamic Rubbers Ltd., printed from website www.dynamicrubbers.com on Sep. 21, 2004, 3 pages.

Special Purpose Belts, Dynamic Rubbers Ltd., printed from website www.dynamicrubbers.com on Sep. 22, 2004, 2 pages.

Conveyers, printed from website www.Foodex.Org.Uk on Sep. 20, 2004, 2 pages.

Product Data—Grabber, Habasit AG, Oct. 29, 2002, 5 pages.

Lightweight Belts, printed from website www.skellerup.co.nz on Sep. 21, 2004, 3 pages.

Chrome-Leather, Viton, Correx, Linatex, Polythan D44, Product Catalog, BREC Zahnriemen, printed from website http://mulco.cadclick.de on Sep. 22, 2004, 3 pages.

Ceilofex, HV1 foil, compound coatings, Product Catalog, BREC Zahnriemen, printed from website http://mulco.cadclick.de on Sep. 22, 2004, 2 pages.

Conveyor Belting, Goodyear Rubber Products Corp, printed from website www.goodyearinternational.com on Sep. 21, 2004, 4 pages.

Industrial Belting, 21st Century Technologies of America, Inc., printed from website www.team21st.com on Sep. 21, 2004, 4 pages.

Google Patent Search for "+silicone+conveyor+belt+(ribs or cleats or chevrons or flighted)" et al. printed from website www.google.com on Sep. 21, 2004, 1 page.

Letter from Carponelli & Krug, 230 West Monroe Street, Suite 250, Chicago, IL, 60606, dated Oct. 6, 2004, regarding U.S. Appl. Pub. No. 2004/0109986/A1.

Deposition Transcript of Scott Mar.-Aug. 3, 2006 at 10:00 am, 216 pages.

Deposition Transcript of Scott Mar.-Aug. 3, 2006 at 3:42 pm, 249 pages.

Office Action from European Patent Application 00202394.3-2307, dated Jun. 21, 2005, 18 pages.

Summons to attend oral proceedings from European Patent Application 00202394.3-2307, dated Jul. 26, 2006, 3 pages.

Office Action from 90/008,001 (Reexamination of US 6,919,122) dated Feb. 12, 2007, 10 pages.

Deposition of Ronald Godsen—Sep. 22, 2006, 288 pages.

Deposition of Glenn Schakmuth- Sep. 20, 2006, 325 pages.

Saint-Gobain Complaint, filed Dec. 23, 2005, 6 pages plus Tabs A-D.

Saint-Gobain's Memorandum in Support of Plaintiff's Motion for a Preliminary Injunction, Jan. 17, 2006, 21 pages.

Jan. 16, 2006 Declaration of Ruth A. Jamke, 5 pages.

Jan. 12, 2006 Declaration of Peter D. Spohn, 4 pages.

Jan. 12, 2006 Declaration of Kevin C. Bauler, 6 pages plus Exhibits A-F.
Jan. 12, 2006 Declaration of Marcus A. Burch, 4 pages plus Exhibits A-K.
Defendants Opposition to Plaintiff's Motion for Preliminary Injunction And, Alternatively, Motion to Stay Pending Decision on Transfer Motion, filed Jan. 31, 2006, 13 pages.
Jan. 31, 2006 Declaration of W. Christopher Lewis, 2 pages.
Jan. 31, 2006 Declaration of Douglas H. Pauley, 4 pages plus Exhibits A-D.
Reply in Support of Plaintiff's Motion for a Preliminary Injunction, filed Feb. 7, 2006, 11 pages.
Feb. 7, 2006 Declaration of Ruth A. Jamke, 3 pages.
Sur Reply in Opposition to Plaintiff's Motion for Preliminary Injunction, filed Feb. 9, 2006, 5 pages.
Fax From Pauley, Petersen, & Erikson, dated Mar. 28, 2006, 2 pages.
Furon Initial Product Development Request (Project E9800547), dated Jul. 29, 1998, 1 page.
Furon Fax Cover Sheet re: A.J. Antunes— Project No. E9800547, dated Jan. 21, 1999, 2 pages.
Furon e-mail to Art Rogove, Re: LSR trial Jan. 21, 1999, dated Jan. 22, 1999, 2 pages.
Furon Memorandum Re: Call report on A.J. Antunes Opportunity $400-$1000K / yr, dated Feb. 20, 1999, 2 pages.
Furon e-mail from Neil Fitchett re: Antunes, dated Mar. 2, 1999, 1 page.
Discussion of Other Information by Kevin C. Bauler, dated Apr. 4, 2006, 3 pages.
Owner's Manual for Model VCT-20 Deluxe Vertical Contact Toaster, Rev C, dated May 2004, 22 pages.
RSI News Briefs, dated Aug. 5, 2002, 1 page.
Picture of contact toaster design with wrap belt, sketched Apr. 16, 1997, 1 page.
Roundup Installation Instructions VCT-100/200 Rapid Toaster Groovy belt Wrap, dated Aug. 1999, 2 pages.
Request for Reexamination of US Patent No. 6,919,122, 19 pages plus Exhibits A-N.
Illustration / principle / shape of surface structure / pattern of the conveying side of Habasit conveyor and processing belts; Edition: Feb. 8, 1998, 6 pages.
Mol Besting Company (Data sheets and price lists ), 1989, 79 pages (particularly pp. 11-12, 17-18, 33, 49, 56-58, and 77).
Polyurethane Timing Belts with Weld-on Profiles; BRECOflex Co., LLC; Aug. 1997, 15 pages.
NIBA: Introductroy Guide to Conveyor Belting;, National Industrial Belting Association; Apr. 1998, 49 pages, particulary pp. 29-30 and 41.
Exhibit O to Reexamination Request (Declaration of William C. Levensalor In Support of the Obviousness of the claims of U.S. Patent 6,919,122) ; 4 pages.
Defendant's Memorandum in Support of It's Motion To Stay Proceedings Three Months Pending Grant or Denial of Request for Reexamination; U.S. District Court, District of Massachusetts; Apr. 13, 2006, 12 pages.
Declaration of Marcus Burch In Support of Plaintiff's Opposition to Defendant's Motion to Stay Proceedings In Light of Defendant's Request for Reexamination; U.S. District court, District of Massachusetts; Apr. 27, 2006, 5 pages.
Plaintiff's Opposition to Defendant's Motion to Stay Proceedings In Light of Defendant's Request for Reexamination; U.S. District court, District of Massachusetts; Apr. 27, 2006, 21 pages.
Defendant's Reply to Plaintiff's Opposition to Defendant's Motion to Stay Proceedings In Light of Defendant's Request for Reexamination; U.S. District court, District of Massachusetts; May 2, 2006, 6 pages.

* cited by examiner

BELTS WITH INTEGRAL FLIGHTS FOR USE IN HIGH-TEMPERATURE FOOD PROCESSING EQUIPMENT AND SYSTEMS INCLUDING SUCH BELTS

CROSS REFERENCE TO RELATED APPLICATIONS

This application is a divisional of U.S. patent application Ser. No. 09/608,649 filed Jun. 30, 2000 now U.S. Pat. No. 6,919,122 which claimed benefit under 35 U.S.C. § 119(e) of U.S. Provisional Patent Application No. 60/142,758, filed on Jul. 8, 1999, the disclosures of both applications are hereby incorporated by reference.

TECHNICAL FIELD

The invention relates to new and useful modifications of smooth-faced, flexible, fabricreinlorced silicone or fluoropolymer composites. The invention also relates to methods for producing these modified composites economically. The flexible composites of the invention are useful in a variety of applications, for example, for making conveyor belts. In particular, conveyor belts made in accordance with the invention are useful in processes for high temperature food preparation, such as quick service toasting.

BACKGROUND

Silicone rubber-coated fiberglass fabrics, a type of silicone rubber flexible composite, and polytetrafluoroethylene ("PTFE") coated and/or laminated fiberglass fabrics, a type of fluoropolymer composite, are commonly used in conveyor belts for diverse applications. These applications typically require composites that are flexible and thermally stable in operating environments exceeding 300° F. The composites must also possess a low-energy surface to ensure easy release of sticky, viscous, or adhesive materials. In some cases, the composite surface should have a high coefficient of friction, or other surface characteristics or modifications that will allow the belt to transfer lateral force to articles resting on, pressed against, or otherwise being conveyed by the belt.

Rubbers used in the construction of conveyor belts are generally considered to be relatively high-friction materials. However, the coefficient of friction between the surface of a typical conveyor belt made with silicone rubber-coated fabrics and the surface of objects contacting the belt is sometimes insufficient to prevent objects from slipping on the surface. Slippage can occur, for example, when the belt is used to carry objects up or down an incline, or when the belt is employed to provide lateral force to urge an object, slightly compressed between the conveyor belt and another surface, along that surface. In some applications, such as in cooking, dirt, grease, oil, or other contaminants deposited on the surface of the belt further reduce the coefficient of friction and increase the occurrence of slippage.

Ridges, ribs, lugs, or other protuberances may be configured into, or upon or attached to the surface of the conveyor belt to prevent objects on the belt from slipping. The protuberances applied to the surface are sometimes referred to collectively as a flight, and a conveyor belt so modified is called a flighted belt. The flight may consist of separately molded, extruded, or otherwise formed components attached to the belt with adhesives or mechanical fasteners, or the components may be molded into the surface of the composite. The latter operation entails the use of expensive and inflexible molding or embossing dies and equipment.

Flighted conveyor belts have been employed in the prior art for a variety of end uses. However, a flighted conveyor belt is not known in the art for use in a food cooking application wherein the belt is used to convey objects continuously through a heating zone of extremely high temperatures ranging from 250° F. to 525° F. At these high temperatures, belts presently used tend to mark or overly compress objects being cooked, giving the cooked objects an undesirable appearance.

For example, in a contact toaster device such as the one shown in U.S. Pat. No. 4,530,276, issued Jul. 23, 1985 to Dye O. Miller, a metal-linked conveyer belt conveys food objects, such as buns, along and against a heated platen to toast the buns. The buns may be marked by the heated belt or overly compressed against the platen resulting in an undesirable appearance. It would be desirable to create a conveyor belt that efficiently moves objects through a heating zone without marking or overly compressing the objects during cooking. Smooth silicone non-flighted belts available in the art are capable of eliminating markings, but do not exert sufficient lateral force to move food objects consistently and reliably along a heated platen, particularly as the belts become contaminated with grease and debris. Consequently, the food objects do not travel through the heating zone for the prescribed time, resulting in non-uniformity of the cooked product. The present invention was developed to overcome these deficiencies.

It is an object of the invention to provide modified flexible composites with integral flights. Another object of the invention is to provide a method for producing the flighted conveyor belts of the invention. It is an additional object of the invention to provide a flexible composite for use as a conveyor belt in a contact toaster for moving food items. The flexible composites of the invention may also be used as a conveyor belt cover in contact toasters wherein the conveyor belt cover is driven by a chain belt such that the ribs on the flighted face of the conveyor belt cover contact the chain belt and engage horizontal wire elements in the chain belt to reduce slippage between the conveyor belt cover and the chain belt.

It is further an object of the invention to provide a flexible composite for use as a conveyor belt in a vertically-oriented roll toasting machine wherein the conveyor belt contacts theouter, uncut surface of the roll halves, and provides lateral force to the rolls such that the rolls slide with their cut surface along a stationary, toasting surface, without producing indentations, markings or blemishes on the outer surface of the rolls.

It is a further object of the invention to provide a flexible composite for use as a conveyor belt in a food preparation or other device involving liquid flow wherein the conveyor belt comprises multiple ribs raised above the face of the belt that contacts the involved food or other article wherein the raised ribs control or direct liquid flow between the articles and the belt.

It is a further object of the invention to provide a flexible composite for use as a conveyor belt in a variety of devices, for example a semiconductor processing machine, wherein the conveyor belt comprises multiple raised ribs that control or direct the spacing or location of articles upon the conveyor belt in up to three dimensions.

A further object of the present invention is to provide a flexible composite for use as a conveyor belt in a variety of automated mechanical devices, for example, an automated mechanical conveyor machine, wherein the conveyor belt comprises multiple ribs raised above the face of the belt wherein such ribs mold, cut, shape, contain, or retain the articles upon the conveyor belt for use in moving the articles through an assembly operation.

A further object of the present invention is to provide a flexible composite for use as a texture producing belt in an architectural or other decorative/artistic application wherein the belt comprises multiple ribs raised above the face of the belt wherein such ribs directly or indirectly, through molding, offset, or transfer processes, provide architectural or decorative textures to a variety of materials for use in such applications.

A further object of the present invention is to provide a flexible composite for use as a production belt in a materials production process, wherein the production belt comprises multiple ribs raised above the face of the belt wherein such ribs include absorbers or susceptors of infrared, microwave, or radio frequency radiation or electrically conductive fillers allowing the ribs to be heated or otherwise energized so that they can be used to brand, mark, emboss, laminate, or otherwise impress or texturize appropriate materials for use in a wide array of applications, such as, for example, bubble packaging.

The conveyor belts of the invention are suitable for use in high temperature applications, and may be constructed of various composites, including fabric-reinforced silicone rubbers, urethane rubbers, or fluoropolymer, including fluoroplastics (such as PTFE) and fluoroelastomers, or blends thereof The methods for making such flexible composites allow for flexibility in forming the shape, height and other characteristics of the flight. Advantageously, in cooking applications, conveyor belts of the invention and conveyor belts made of composites using the methods of the present invention provide a means for ensuring uniform time and temperature exposure of the object being cooked. In addition, such conveyor belts do not unduly mark or compress the object being conveyed through a zone of high temperature, are easily and quickly cleaned after use, and are relatively inexpensive to produce.

SUMMARY

The invention relates to a modified flexible composite useful for many applications. In particular, the flexible composite is useful for making flighted conveyor belts. Conveyor belts made with the composites of the invention are stable and suitable for conveying materials, such as food, through high temperature heating apparatuses.

In one embodiment, a flexible composite comprises a reinforcement material having two faces, wherein at least one face consists of a coating with multiple ribs raised above the face. The ribs may be oriented in a regular, repeating, natural, random or cyclical pattern. The ribs may be composed of the same material as the coating of the composite. The ribs are formed or made onto or adhered to the smooth surface of the face of the composite. The face of the composite and the ribs may be made of various materials, including silicone rubbers, urethane rubbers, or fluoropolymer, including fluoroplastics (such as PTFE) and fluoroelastomers, or blends thereof The reinforcement material can be selected from various types of fibers, fabrics, or films, including fiberglass, nylon, polyester, or aramid, preferably a glass fiber, or polyethylene, polyolefins, polyimides, or films thereof These and further objects will become apparent from the following brief description of the drawings and detailed description.

DETAILED DESCRIPTION OF THE INVENTION

Figure 1:
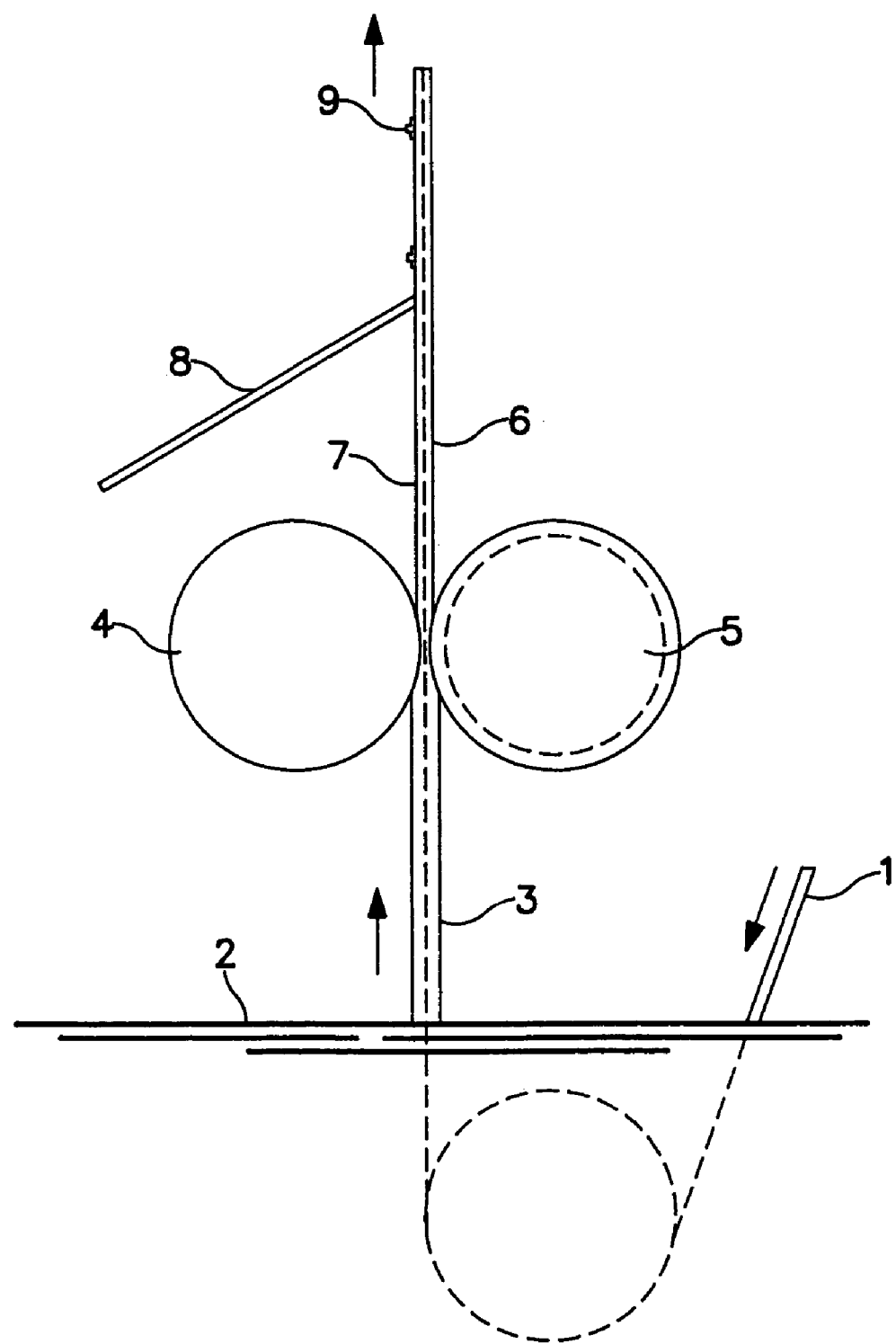
FIG. 1 is an end view of a metering and wiping arrangement used in producing composites of the invention.

The invention provides a flighted, flexible composite useful for many applications. In particular, the invention provides a flexible composite comprising a reinforcement material with a coating on at least one face having a multiplicity of ribs raised above the coated face, in a regular, repeating, natural, random, or cyclical pattern. The flighted flexible composites of this invention are particularly useful for making conveyor belts. The flighted conveyor belts of the invention can be used, for example, in the food industry in conjunction with high temperature food processing, ranging from about 300° F. to 525° F. in cycles of short duration, for example, less than 30 seconds, without significantly altering performance. For example, in one embodiment of the invention, a conveyor belt is made of a flighted fabric-reinforced silicone rubber composite that can withstand temperatures up to 450° F. for short duration. In another embodiment, the flighted conveyor belt is made of a PTFE composite that can withstand temperatures up to 525° F. for short duration. It is envisioned that the flighted conveyor belt may also be constructed from urethane rubber in an application that involves temperatures that will not compromise the integrity of the urethane rubber.

The flexible composite of the present invention comprises a reinforcement material with a coating on at least one face, and a multiplicity of ribs raised above the coated face of the reinforcement material. The multiple ribs comprise preferably more than one rib per linear foot of composite, and may include up to and including as many ribs as practically and workably may fit for a given application per foot of composite. However, the number of ribs per linear foot is application-specific as is their orientation and configuration (the density of ribs per linear foot and shape and height of the ribs). The multiple ribs raised above the coated face of the reinforcement material of the flexible composite may be oriented in a regular, repeating, natural, random, or cyclical pattern. A regular pattern includes, but is not limited to, a normal or standard pattern to be used for a particular application. A repeating pattern includes, but is not limited to, any pattern wherein the ribs repeat, whether the ribs are identical or different in shape, size, type, or purpose. Repeating patterns may also include a collection of ribs of different sizes and shapes that repeat as a series around the belt. A natural pattern includes, but is not limited to, any pattern wherein the ribs result from the ordinary course of the production process. A random pattern includes any pattern that is not regular, repeating, natural, or cyclical, as described herein. A cyclical pattern includes, but is not limited to, any pattern which includes a circular or spiral arrangement of ribs or any pattern which is recurring and starts over again.

In accordance with one embodiment of the invention, a continuous web of a reinforced silicone rubber composite, bearing a multiplicity of longitudinal raised parallel ribs on its surface, is produced by dip-coating, metering and/or wiping, appliqué, and thermal curing processes. The ribs are parallel to one another and are generally parallel with the longitudinal dimension of the web. The ribs may be straight or may incorporate a regular, repeating, natural, random or cyclical pattern, including joined "S-shaped" curves, sinusoidal waves, or zigzags. The ribs may be continuous or discontinuous, i.e., resembling dashed or dotted lines. The ribs may also be on one or both faces of the web, and the pattern formed by the ribs on one face may be the same or different from the other face.

The reinforcement material used in this invention may be fiberglass, nylon, polyester, aramid, polyethylene, polyolefins, polyimides, or other fiber or film suited to the end use of the flexible composite and the operating temperatures in which it will be used.

In one method of the invention, flighted flexible composites are produced in a continuous process whereby reinforcement material is paid off a roll and saturated and/or coated with a controlled amount of a platinum catalyzed, addition cure, solventless, liquid silicone rubber ("LSR") formulation. The LSR formulation has a viscosity, for example of 10,000 to 1,000,000 centipoise, preferably between 10,000 and 100,000 centipoise. The LSR formulation used in this invention is typically composed of a commercially available two component system, for example, A and B components that are mixed in a specified ratio, typically 1:1 or 10:1. Each component typically contains vinyl-terminated polydimethylsiloxane polymers and may contain fumed silica as a reinforcing filler, and/or extending filler. Typically, one component, for example the A component, contains a catalyst, and the other component, for example the B component, contains a crosslinking agent and an inhibitor that is removed by heating to allow the LSR formulation to cure into a solid rubber. The LSR formulation may also incorporate pigments and/or other additives.

In the coating process of a method of the invention, reinforcement material having two faces is typically drawn around an idler roller and immersed in a bath of LSR formulation. The reinforcement material is thus saturated and/or coated to form a web. The saturated and/or coated reinforcement material is then drawn through wipers. The wipers used in the coating process may be wiper blades, wiper bars, or metering rods, and are set up and/or adjusted to remove the excess formulation picked up in the bath allowing the desired amount to remain on the web.

If a series of straight, parallel, longitudinal ribs is desired, the wipers used to meter the LSR formulation on a face of the reinforcement material, may have a series of grooves or notches incorporated in the wipers, which corresponds to the number, spacing, and size of the ribs desired. The final cross-sectional shape of the ribs thus formed will be controlled by several factors, including: the shape and size of the grooves in the wipers; the rheology of the LSR formulation; and the web speed or the speed at which the reinforcement material is drawn and the web is produced.

If a series of parallel wavy or zigzag ribs on a face is desired, a secondary, reciprocating wiper with a series of grooves or notches corresponding to the number, spacing, and size of the ribs desired, may be used to redistribute the application of LSR formulation as the web moves past the wiper to produce the desired rib pattern. The nature of the reciprocating motion will determine the type of cyclical pattern produced. For example, a wiper driven by an ordinary crank rotated at a constant speed will produce a sinusoidal wave; one driven back and forth at a constant linear speed, as by an air cylinder working against a dashpot, will produce a zigzag pattern, and so forth. The frequency of a repeating pattern in the finished product may be controlled by the relationship between the frequency of the reciprocating motion and the web speed. The amplitude of the repeating pattern may be controlled by the stroke of the reciprocating mechanism.

The web thus coated is completed by passing the web through an oven or other heating device, raising the temperature of the coating sufficiently to drive off or decompose the inhibitor allowing the LSR formulation to cure into a solid rubber.

In another embodiment of the invention, flighted flexible composites of the invention may also be produced in a two-operation process. This two-operation process is similar to the process described above, except that a smooth coating of silicone rubber is applied to reinforcement material in a first operation to one or both faces of the web, and a pattern of parallel ribs onto the coating of one or both faces of the web is applied in a second operation. In the two-operation process, the LSR formulation employed for forming the ribs in the second operation can be the same as or different from the LSR formulation used for coating a face of the web in the first operation, so long as the two formulations are compatible with one another and the ribs adhere adequately to coating on the face. The ribs may be comprised of softer or harder rubber than the coating. The ribs may also be formed of a LSR formulation having a higher viscosity than the LSR formulation of the coating to allow better control of their cross-sectional shape. The ribs may be pigmented differently than the coating on the face of the web. The ribs may be different in other respects from the coating as demands imposed by the intended application or the processing characteristics of the raw materials may require.

In another embodiment of the invention, the web may also be saturated and/or coated with an LSR formulation by means of applicators, instead of by dipping and wiping as described above. Also, in both the one-operation and two-operation processes, the ribs may be generated by applying the LSR formulation that forms the ribs by an applicator, die or manifold with a series of openings or nozzles corresponding to the number, spacing, size, and shape of the ribs desired.

If a series of straight, parallel ribs is desired, the applicator, die or manifold will be stationary as the web moves past the applicator, die or manifold to produce the desired rib pattern. If parallel wavy or zigzag ribs on a face are required, the whole applicator, die or manifold is moved back and forth across the face of the moving web as the LSR formulation is applied. The LSR formulation forming the ribs may be applied in this manner in the same operation in which the coating is applied, in which case both applications may be cured at the same time, or in separate operations. Although it involves a somewhat more complicated process, the use of an applicator, die or manifold to apply LSR formulation to form the ribs may offer advantages. By modulating the supply of LSR formulation to the applicator, die or manifold, discontinuous ribs, resembling dashed or dotted lines, or ribs periodically varying in thickness or weight, may be produced. Even in a one-operation process, the LSR formulation used to form the ribs may be pigmented differently from the coating. LSR formulations used in this applicator method can have a higher viscosity than that which could be employed in a dipping or wiping method thereby allowing the shape of the ribs to be controlled primarily by the shape of the applicator, die or manifold openings.

In accordance with another embodiment of the invention, a continuous web of a reinforced fluoropolymer composite, bearing a series of longitudinal raised parallel ribs on its surface, is produced by dip-coating, metering and/or wiping, appliqué, and thermal curing processes. The ribs are parallel to one another and generally parallel with the longitudinal dimension of the web. The ribs may be straight or incorporate a regular, repeating natural, random or cyclical pattern, for example, joined "S-shaped" curves, sinusoidal waves, or zigzags. The ribs may be continuous or discontinuous, i.e., resembling dashed or dotted lines. The ribs may also be on one or both faces of the web, and the pattern formed by the ribs on one face may be the same or different from the other face.

In this embodiment, flighted flexible composites are produced in a continuous process whereby reinforcement material is drawn from a roll and coated with unfused fluoropolymer by dipping the reinforcement material in an aqueous dispersion or latex containing the desired fluoropolymer. Excess dispersion is removed from the web by wiping or metering, or drying to remove the water. Lastly, the web is heated to remove most of the surfactant, using techniques familiar to those skilled in the art of producing PTFE coated and/or laminated reinforced composites, described for example in U.S. Pat. No. 5,141,800 to Effenberger et. al. Typically, the fluoropolymer coating operation will be repeated several times in order to apply the desired amount of fluoropolymer. In a preferred embodiment, the fluoropolymer on at least the outer surface of the coated web is comprised of unfused PTFE, capable of acting as a thermally activated, pressure sensitive adhesive as described in U.S. Pat. No. 5,141,800.

The web, now consisting of reinforcement material coated with unfused fluoropolymer, is then fed through a nip between rollers, at least one of the rollers being covered with rubber or other compliant material. Beadings of unfused extruded PTFE are supplied to the nip in a stream or streams. Similarly, silica beads may be supplied to the nip in a stream or streams. The number of streams of beadings corresponding to the number of ribs desired. The beadings used may have a diameter from about 1/32" to about 1/2", preferably from about 1/32" to about 1/8". The position of the streams of beadings supplied are controlled by multiple guides gauged together in one unit ("guide unit"). The streams of beadings may be continuous or discontinuous corresponding to the pattern of the ribs desired.

If a series of straight, parallel, longitudinal ribs is desired, the guide unit will have incorporated in it a series of individual guides, corresponding to the number and spacing of the ribs desired. Under the pressure applied by the nip, the unfused PTFE beadings and the fluoropolymer on the surface of the web adhere to one another, as described in U.S. Pat. No. 5,141,800, incorporated herein by reference, thereby bonding the PTFE beadings to the surface. Similarly, where silica beads are used, the silica beads and the fluoropolymer on the surface of the web adhere to one another under the pressure applied by the nip. The final cross-sectional shape of the ribs thus formed will be controlled by several factors, including: the cross-sectional shape and size of the beading used; the density of the beading; the tension applied to the beading as it is supplied to the guide; the characteristics of the compliant covering on the nip roller or rollers; and the web speed used in the process.

If a series of parallel wavy or zigzag ribs is required, the guide unit may be moved back and forth as the web moves past it to produce the desired cyclical pattern. The nature of the reciprocating motion will determine the type of cyclical pattern produced. For example, a guide unit driven with an ordinary crank rotated at constant speed will produce a sinusoidal wave; one driven back and forth at constant linear speed, as by an air cylinder working against a dashpot, will produce a zigzag pattern, and so forth. The frequency of the repeating pattern in the finished product will be controlled by the relationship between the frequency of the reciprocating motion with the web speed. The amplitude of the pattern will be controlled by the stroke of the reciprocating mechanism.

The web with ribs thus applied is then passed through an oven or other heating device, raising the temperature of the coating and the ribs sufficiently to fuse the fluoropolymer components.

In accordance with the invention, the web, when completed, may be converted into conveyor belts of lengths less than the width of the original web as manufactured, by cutting the original belt, with cuts perpendicular to the longitudinal dimension of the web, to a length that corresponds to the width of the belt required. When belts are made in this way, the longitudinal direction of the patterns of ribs, which was parallel with the longitudinal dimension of the web as manufactured, becomes transverse or perpendicular to the longitudinal dimension of the conveyor belt, also referred to as the "machine direction," of the belt. Again, the ribs may be either straight and parallel, exhibit some cyclical pattern, or exhibit some other pattern as described herein. Belts of any practical length, and width up to the width of the web as manufactured, may of course also be produced by cutting the web to the length and width of the web desired. In both cases, the belts are completed by the attachment of lacings, flaps, edge reinforcement, guiding hardware, etc., as required.

Belts with integral flights according to this invention enhance the performance of certain types of commercial food-processing equipment in which items of food, for example bread products, slide along a heated cooking surface, for example a griddle or grill, in a continuous toasting or grilling operation. For example, in contact toasters, the lateral force to slide the food item along the cooking surface may be provided by a so-called chain belt or link belt conveyor (see, for example, U.S. Pat. No. 4,530,276). These chain belts have horizontal wires. The longitudinal dimension of the horizontal wires are perpendicular to the direction that the belt is moving and the horizontal wires move in a plane parallel to the cooking surface. The distance between the belt path and the cooking surface is adjusted to slightly compress the food items, allowing the horizontal wires to provide the lateral force to move the food along the cooking surface. The localized pressure exerted by the relatively small-diameter wires is often sufficient to leave permanent marks on the food items, which in some cases is undesirable. The chain belt is essentially an open configuration and therefore is unable to retain heat in the food items. In cases where the food item is to be served warm, this loss of heat is also undesirable.

These and other deficiencies are eliminated by using the flighted composites of this invention as a conveyor belt cover or an outer belt covering a metal link type conveyor belt. The flights and surface characteristics of flexible composites of the present invention allow the conveyor belt covers to impart sufficient lateral force to move the food items along a cooking surface. The normal force applied to the food items is low and sufficiently well distributed that the food items are not marked or damaged. The continuous nature of the belt and its thermal characteristics combine to impart heat uniformly to the food items and warm them to serving temperature.

It is also contemplated that belts according to this invention used alone, as the primary conveyor and not merely as a cover or used in conjunction with a chain belt, link type belt or other belt, could perform the above functions equally well in suitably designed food-processing equipment.

Belts with integral flights according to the present invention further allow for the control of liquid flow in the process of cooking food, including, for example, meat products, which slide along, above, or below a heated cooking surface in a continuous cooking or grilling operation wherein liquid flow may occur. For example, in a continuous grilling or broiling machine, belts with integral flights according to this invention serve to direct liquid below the food article between the belt and the food article in the space provided by the ribs. In this way, the flow of liquids, such as juices or grease from meat products or marinades, may be controlled to flow away from or drain from the food.

The raised ribs of the integral flights of this invention are also envisioned to control the spacing and location of articles, including food articles, upon the belt of the present invention. Spacing in the vertical direction of an article upon the belt of the present invention may be controlled by the height of the ribs and location in two horizontal dimensions, one along the length and one along the width of the belt, may be controlled by strategic placement of the ribs. For example, in cooking, it may be desired to keep food articles upon the belt above and without direct contact with the face of the belt and only in contact with the raised ribs. In this way, the degree of cooking, amount of drainage or liquid flow, and degree of marking, if any, may be controlled by the height of the ribs. Moreover, maintaining belt spacing above a slider bed may be desired, with the ribs containing durable fillers as sacrificial wear strips so that heating or cooling fluids may be introduced beneath the belt. In the two horizontal directions, in may be desired to index or track the number or amount of articles passing a point on the belt or in the cooking process with the ability to count some or all articles passing. By using a flighted belt of the present invention including ribs in a grooved or guided pattern, it is possible to direct articles to a certain location on the belt which may then be indexed or tracked by some tracking or indexing means.

The beneficial characteristics of spacing, locating, and control of liquid flow of the present invention are also contemplated for use in applications not involving food preparation. For example, in the manufacture of computer or electronics equipment, it may be desired to vertically space or horizontally locate articles, for example, semiconductors or parts thereof in the processing stages of manufacturing components, such as circuit boards.

A further contemplated use of the flexible composite of the present invention is as a conveyor belt wherein the raised ribs are patterned to mold, cut, shape, contain, or retain the articles upon the conveyor belt. In food preparation applications, such a belt could include ribs of a circular pattern and, for example, be used to mold and cut dough or batter into desired shapes and sizes for tortilla or flatbreads or the like, or mold and contain or retain liquid or semi-liquid foods, such as egg mixtures or gelatin for fast foods or desserts. In non-food preparation applications, the flighted belt may include ribs in a pattern designed to contain bulk material, such as powders or small parts.

The flexible composites of this invention may further be used as a texture producing belt in an architectural or other decorative or artistic application wherein the belt comprises multiple ribs raised above the face of the belt wherein such ribs directly or indirectly, through molding, offset, or transfer processes, provide architectural or decorative textures to a variety of materials for use in the architectural or decorative arts.

The flexible composites of this invention may further be used as a production belt in a materials production process, wherein the production belt comprises multiple ribs raised above the face of the belt wherein such ribs include absorbers and/or susceptors of infrared, microwave, or radio frequency radiation or electrically conductive fillers allowing the ribs to be heated or otherwise energized so that they can be used to brand, mark, emboss, laminate, or otherwise impress or texturize appropriate materials for use in a wide array of applications, such as, for example, bubble packaging.

FIGS. 1 through 4 illustrate some aspects of this invention.

FIG. 1 shows an end-view of the metering and wiping arrangement used in producing the silicone rubber coated web with integral flights. A web of glass fabric 1 is drawn through a reservoir of liquid silicone rubber (LSR) 2. The web, now coated with an excess of uncured LSR 3 emerges from the reservoir and is drawn between a smooth steel wiper bar 4 and a circumferentially grooved wiper bar 5, the size, number and spacing of the circumferential grooves corresponding to the size, number and spacing of the straight, parallel ribs desired on the face of the product on the right in the drawing. At both ends the wiper bars are rigidly clamped against spacers (not shown) made of steel feeler gauge stock, to maintain the desired gap between the wipers. The web, now carrying straight, parallel ribs of LSR on the face to the right in the drawing 6 and a metered uniform coating of LSR on the face to the left in the drawing 7 is drawn past a secondary, notched wiper blade 8, which contacts the face of the product on the left in the drawing and oscillates in and out across this face in the axis normal to the drawing, redistributing the layer of LSR on the surface to form a repeating pattern of parallel, wavy ribs 9. The size, number and spacing of the notches in the wiper blade correspond to the size, number and spacing of the parallel, wavy ribs desired. The nature of the oscillating motion will determine the basic nature of the waves produced. The frequency of the repeating pattern will be controlled by the relationship between the frequency of the reciprocating motion with the web speed. The amplitude of the pattern will be controlled by the stroke of the reciprocating mechanism. The web now coated with uncured LSR metered and patterned as desired, enters the tower oven above (not shown) to be cured.

Figure 2:
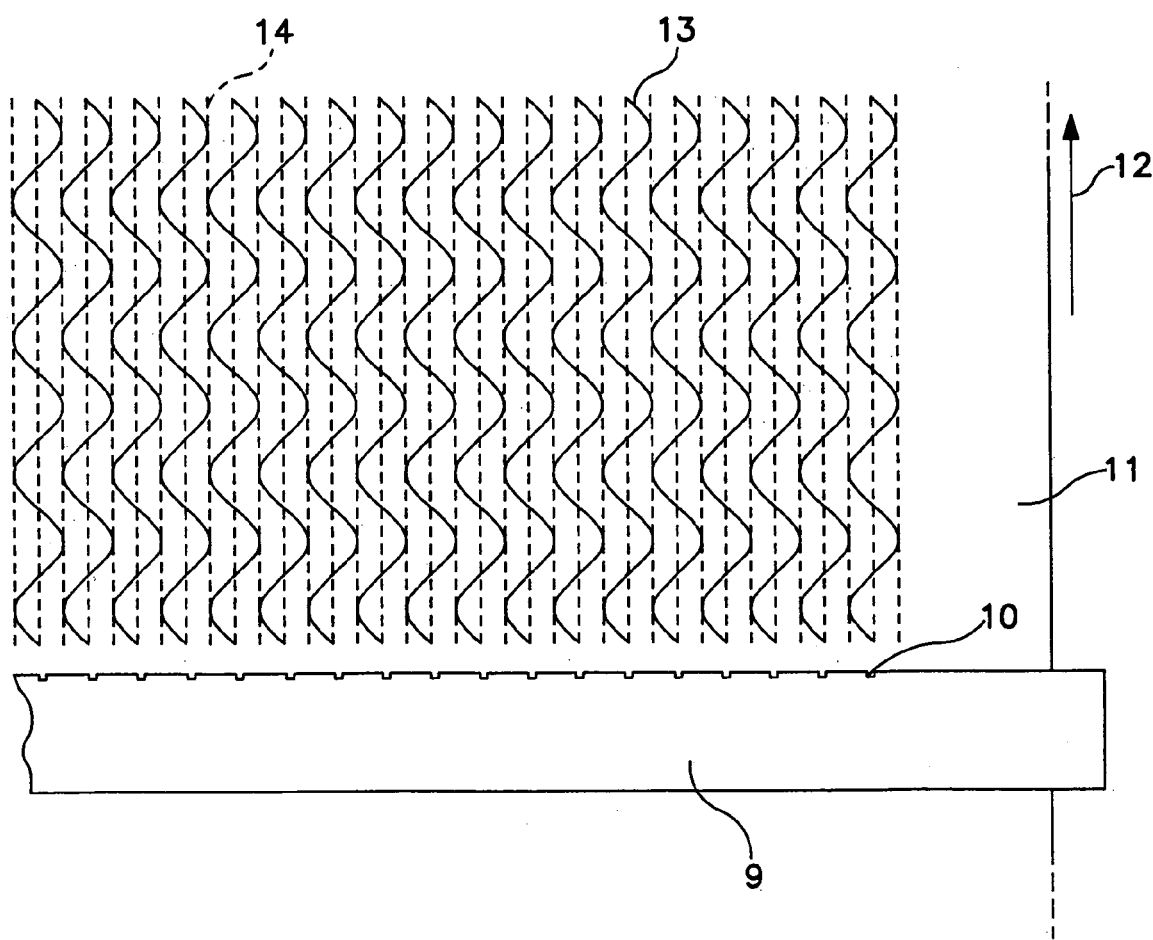
FIG. 2 is a top view of a composite of the invention having a sinusoidal (wavy) rib spacing pattern, and a side view of the notched wiper blade used in producing the pattern.

FIG. 2 shows the notched wiper blade 9 that contacts the face of the product on which the wavy pattern is desired. The notches 10 are sized and spaced according to the desired sizing and spacing of the wavy ribs. As the web 11 moves past the wiper in the direction of the arrow 12 and the notched wiper moves back and forth perpendicular to the web direction, the pattern of wavy ribs 13 is formed. The straight parallel ribs on the face of the web not shown in the figure, formed by the circumferentially grooved metering bar, are indicated with dotted lines 14.

Figure 3:
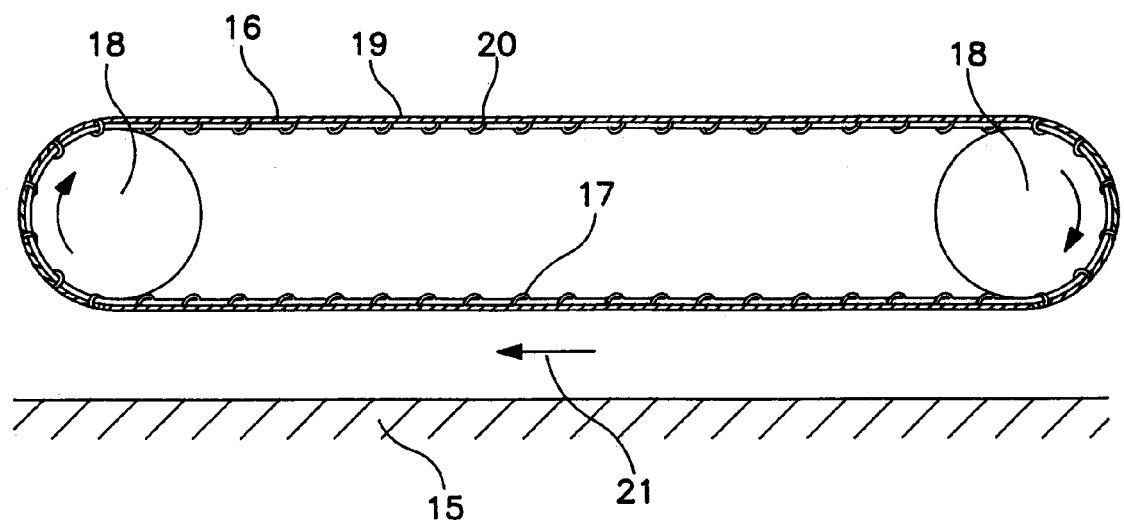
FIG. 3 is a side view of a typical food cooking apparatus employing the flexible composite conveyor of the invention.

FIG. 3 shows a cross-section of the type of food-processing equipment in which silicone rubber belts with integral flights according to this invention enhance performance. In this equipment, items of food, for example bread products, slide along a heated cooking surface 15 in a continuous toasting or grilling operation. The lateral force to slide the food item along the cooking surface is provided by a silicone rubber belt 16 according to the invention, covering a chain belt 17 that is driven by rotating sprockets 18. The chain belt has horizontal wires 19, their long dimension perpendicular to the direction of the moving belt, that engage the parallel straight ribs 20 on the inner side of the silicone belt, preventing slippage. The distance between the belt path and the cooking surface is adjusted to slightly compress the food item. The wavy ribs and the surface characteristics of the silicone rubber allow the belt to impart sufficient lateral force to move the food item along the cooking surface in the direction indicated by the arrow 21, yet the compressive force applied is low enough and sufficiently well distributed that the food item is not marked or damaged. The continuous nature of the belt and its thermal characteristics combine to retain heat in the food item and warm it to serving temperature.

Figure 4:
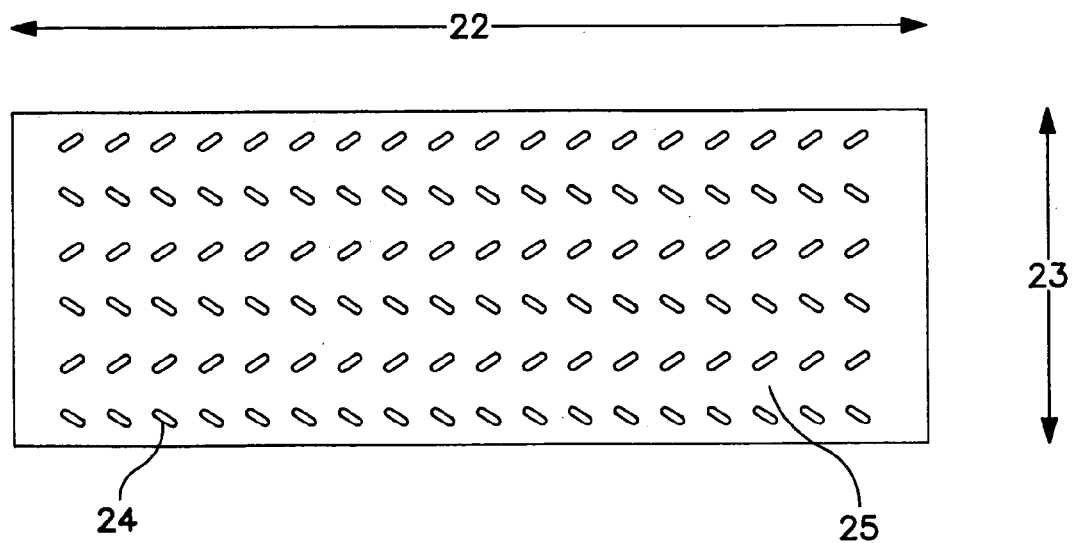
FIG. 4 is a top view of an embodiment of the invention used as a cooking belt.

FIG. 4 shows a cooking belt blank cut from a web produced as described in Example 5. The long dimension 22 of the belt is perpendicular to the long or machine direction 23 of the web as coated. The cleats 24 on the face of the belt are directly opposite essentially identical cleats on the face of the belt not visible. The tops of the cleats stand between about 0.020 inches and 0.050 inches above the smooth background surface 25.

The following examples are illustrative in nature and are not to be interpreted in a limiting sense. Those skilled in the art will recognize that various modifications can be made to the methods and flighted flexible composites described herein without departing from the spirit and scope of the present invention.

EXAMPLE 1

A roll of 38 inch wide, 6 ounce per square yard ("osy") fiberglass fabric, industry style no. 7628, with most of the sizing removed by caramelization (210 finish) is coated by being drawn, at a rate of about 4 to 6 feet per minute, through a bath of an LSR formulation composed of 50 parts by weight each of Wacker Silicones Elastosil~LR6289A and LR6289B and about 12 parts by weight of a red iron oxide masterbatch containing about 35 percent iron oxide and about 65 percent vinyl terminated silicone polymer. All components of the LSR formulation were certified by their manufacturers to comply with the requirements of 21 C.F.R. § 177.2600 for rubber articles intended for food contact applications. The viscosity of the formulation is about 50,000 centipoise.

After the saturated and coated web emerges from the bath, the excess formulation is removed by drawing the web between two cylindrical wiper bars spaced about 0.015 inch apart. One bar is smooth; the other bar has incorporated regularly spaced circumferential turned grooves 0.125 inch wide and 0.125 inch deep on 1 inch centers. As the web is drawn between these bars and excess material is removed, a smooth surface is produced on one face by the smooth bar, and a smooth surface broken by parallel, longitudinal ribs or ribs is produced on the opposite face by the grooved bar. The web is then drawn through a tower oven supplied with air at about 350° F. to heat the LSR formulation sufficiently to remove the inhibitor and allow it to cure. The finished material weighs about 16 osy. The thickness in the smooth areas is about 0.012 inch. The ribs on the face containing them are lenticular in cross section; they stand about 0.025 inch high above the smooth surface and are about 0.2 inch wide at the base.

EXAMPLE 2

A roll of 6 osy fiberglass fabric is coated as described in Example 1. After the saturated and coated web emerges from the bath the excess formulation is once again removed by drawing the web between two cylindrical wiper bars, one smooth and one with regularly spaced turned grooves. Again, as the web is drawn between these bars a smooth surface is produced by the smooth bar and a smooth surface broken by longitudinal ribs is produced by the grooved bar.

In this example, however, the wet LSR formulation on the smooth face is subjected to a secondary wiping operation before it enters the curing oven, as follows. A wiper blade, with notches in the (otherwise straight) wiping edge about 0.0625 inch wide and 0.0625 inch deep, spaced about 1.5 inches apart on center, is positioned to lightly contact the web in the area between the smooth wiper bar and the oven entrance. The mounting of this blade is constructed so that the blade is free to slide back and forth across the face of the web in a plane perpendicular to the longitudinal dimension of the web. The blade is driven back and forth by means of a simple crank mechanism connected to the blade as the coated web is drawn past the blade. The smooth layer of LSR formulation on the surface is thus redistributed, producing a series of parallel, sinusoidal ribs.

The web is then drawn through the tower oven and cured. The finished material weighs about 16 osy. The thickness in the smooth areas is about 0.010 inch. The parallel, straight ribs on the face containing them are similar to those described in Example 1. The opposite face bears a series of parallel, sinusoidal ribs, running generally in the longitudinal direction of the web. As a result of the speed of the web and the revolutions per minute and stroke of the crank mechanism used to drive the secondary wiper, the period of the sine wave pattern is about 4.5 inches and the amplitude is 1.5 inches, peak-to-peak.

EXAMPLE 3

A conveyor belt cover for use over a wire belt and to contact food items such as rolls and slide them along the surface of a heated platen in a high-volume restaurant toaster, is constructed from the material produced in Example 2, as follows. Using cuts perpendicular to the longitudinal dimension of the finished material, a length of material corresponding to the width of the desired belt is cut from the web. As the finished belt is to be about 11 inches wide and about 33 inches long, the length cut from the 38 inch wide web is 11 inches. The parallel, straight ribs, longitudinal on the web as it was coated, are now perpendicular to the longitudinal dimension of the belt to be constructed. Likewise, the sinusoidal ribs now also follow lines generally perpendicular to the longitudinal dimension of the belt. The piece is then cut to 33 inches and the belt is finished with the attachment of appropriate reinforcement material, lacings, and flaps to the narrow ends.

In the toaster, the sinusoidal ribs contacting the rolls are found to drive the rolls with less slippage than a smooth-faced belt made of similar materials. The difference in the effectiveness of the sinusoidal-ribbed belt and the smooth-faced belt becomes more apparent over time, as volatiles produced in the toasting process continue to be deposited on the web and build up, forming a glaze. The sinusoidal-ribbed belt continues to slide rolls effectively after 12 weeks in use with only minimal maintenance, whereas the similar, but smooth-faced, belt begins to slip after only about 3 weeks in use. Additionally, the transverse ribs on the opposite face of the belt engage the transverse wires of the wire belt, eliminating slippage that sometimes occurs with a smooth-faced belt.

EXAMPLE 4

A sample of 6 osy fiberglass fabric, industry style no. 7628, greige finish, is coated with unsintered PTFE resin by being repeatedly drawn through a bath of aqueous PTFE dispersion, passed through a wiping arrangement to remove excess PTFE dispersion, and passed through a two-zone tower oven, which in the first zone dries the dispersion at 300° F. and in the second zone heats the deposited PTFE resin to remove surfactants and other additives at 590° F., consolidating the resin layer. Repeating the operation several times yields a durable unfused PTFE coated glass fabric weighing about 10 osy, comprised of about 40 percent by weight of PTFE.

A beading of unftised, low density PTFE, about 0.050 inch in diameter and 1.54 specific gravity, is prepared by extruding a paste consisting of coagulated dispersion PTFE resin mixed with about 18.5 weight percent refined mineral spirits (Exxon Isopar® G), through a circular die 0.050 inch in diameter, and drying the extrudate to remove the mineral spirits. The resin is from ICI AD 310 PTFE dispersion, and is obtained by mechanically coagulating the dispersion. The extruder barrel temperature is about 125° F.; the extrusion pressure is in the range of about 15 to 18 kpsi, the extrusion rate varies between 10 and 17 inches per minute.

Lengths of the low-density, extruded PTFE beading are supplied to the moving surface of the unsintered PTFE coated glass fabric, through guides spaced 1.5 inches apart, immediately before the fabric and the beadings are drawn into a room-temperature nip between a 70 durometer (Shore A) rubber-covered roller and a steel roller. The face of the fabric to which the beadings are supplied faces the rubber-covered roll. The web emerging from the nip was cut into sheets that were placed, individually, in an oven suitable for sintering the PTFE components of the construction. On removal from the oven, roughly semicircular, translucent, PTFE ribs were found to be well adhered to the sintered PTFE face of the composite.

Thermal welding employing PTFE as a thermally activated pressure sensitive adhesive to create a joint whose thermal capability is as high as the PTFE composite itself using the materials of this example is contemplated.

EXAMPLE 5

A roll of 6 osy fiberglass fabric is saturated and coated with LSR as described in paragraph 1 of Example 1. After the saturated and coated web emerges from the bath the excess formulation is removed by drawing the web between stationary, cylindrical wiper bars spaced about 0.015 inches apart, but in this example both bars are smooth, and a thin, smooth film of uncured LCR is metered onto both faces of the web as it passes through the gap between the bars.

The web then passes between two identical arrays of 18.15 gauge cannulas, their tips spaced at 1.5 inch intervals, arranged in a line perpendicular to the longitudinal direction of the web, one array opposite each face of the web and positioned so that the tip of each cannula on one face is directly opposite the tip of the corresponding cannula on the opposite face, and located about 0.15 inch from the opposite tip, or 0.075 inch from the plane of the web passing between the two tips. The cannulas are supplied with LSR, viscosity about 90,000 cps, at a pressure of about 350 psi, through pneumatically-operated valves.

The arrays of cannulas are supported on a carriage so they can move as a unit in a transverse path perpendicular to the longitudinal or machine direction of the web. By means of a crank mechanism connected to the carriage, the cannula arrays can be moved back and forth in a reciprocating motion. If the valves were opened under these conditions as the moving web passed between them, a series of parallel, sinusoidal ribs, spaced 1.5 inches apart and running generally in the longitudinal direction of the web would be extruded onto the web, producing a pattern on both faces similar to that described in paragraph 3 of Example 2.

In this Example, however, the valves supplying the cannulas are opened and closed automatically by a switch operated by a cam on the reciprocating mechanism. By this means the carriage motion and the valve operation are synchronized, so the valves open when the carriage is in the two, short, more-or-less linear segments of the stroke, i.e., when the crank arm is roughly perpendicular to the motion, and closed in the two, longer, non-linear segments when the crank arm is more nearly parallel. The web speed and carriage traverse speed are selected to produce a repeating pattern on both faces of the moving web consisting of transverse rows of 18 approximately linear, slanting cleats, about 0.75 inches long. All the cleats in each transverse row are approximately parallel to the adjacent cleats in that row, while in the machine direction the cleats in alternating rows alternate positive and negative in slope. The pattern produced covers the central 27 inches of the web.

The web is then drawn through the tower oven and cured. The finished material weighs about 14 osy. The thickness in the smooth areas is about 0.010 inches. The central region on both faces of the web is covered with a repeating pattern of slanting cleats, as shown in FIG. 4. The tops of the cleats are about 0.30 inches above the smooth areas. The cleats are directly opposite one another, so the thickness through the pair of cleats on opposite faces of the web is about 0.070 inches.

We claim:

1. A contact toaster for toasting bread products comprising:
   a heating zone comprising a heating element configured to contact and toast a second face of bread products; and
   a first belt configured to move the bread product through the heating zone, the belt comprising,
      a reinforcement material having a first face and a second face;
      a coating disposed over the first face;
      a first plurality of ribs raised above the first face of the reinforcement material, the first plurality of ribs being transverse to a longitudinal direction of the first belt and being configured to impart lateral force to objects carried by the first belt; and
      a second plurality of ribs raised above the second face of the reinforcement material, the second plurality of ribs comprising a plurality of straight ribs transverse to a longitudinal direction of the first belt;
   wherein a pattern of the first plurality of ribs is different than a pattern of the second plurality of ribs; and
   wherein the first belt is configured to wrap around a second belt such that a plurality of the second plurality of ribs contact the second belt;

wherein the first belt is configured to withstand the temperatures of the heating zone; and wherein the first belt contacts a first face of bread products.

2. The contact toaster for toasting bread products of claim 1, further comprising the second belt which comprises at least one of a chain belt, wire belt, and metal belt, wherein the first belt is configured to be coupled to the second belt.

3. The contact toaster for toasting bread products of claim 1, wherein ribs raised above one face are straight and parallel to each other, and ribs raised above another face are arranged in a repeating pattern that is at least one of undulating and sinusoidal.

4. The contact toaster for toasting bread products of claim 1, wherein the first plurality of ribs have a density of at least one rib per linear foot of the first belt.

5. The contact toaster for toasting bread products of claim 1, wherein the first plurality of ribs form a pattern of undulating ribs.

6. The contact toaster for toasting bread products of claim 1, wherein at least one of the first plurality of ribs has a height of at least about 0.020 inches.

7. The contact toaster for toasting bread products of claim 1, wherein the first belt has a structure that is continuous.

8. The contact toaster for toasting bread products of claim 1, wherein the second belt has an open structure.

9. The contact toaster for toasting bread products of claim 1, wherein the apparatus is a vertically oriented toasting machine.

10. The contact toaster for toasting bread products of claim 1, wherein the first belt is configured to move food products through the heating zone such that food products will slide along a stationary toasting surface such that the food product is toasted as it slides.

11. The contact toaster for toasting bread products of claim 1, wherein the apparatus is configured to toast items in a continuous toasting operation.

12. The contact toaster for toasting bread products of claim 1, wherein at least one of the first plurality of ribs and the second plurality of ribs comprise a plurality of ribs spaced apart by about 1.5 inches.

13. The contact toaster for toasting bread products of claim 1, wherein ribs of the second plurality of ribs are spaced apart differently than ribs of the first plurality of ribs.

14. The contact toaster for toasting bread products of claim 1, wherein the first belt is configured such that the first belt helps retain heat in buns and warm them to serving temperature.

15. The contact toaster for toasting bread products of claim 1, wherein the contact toaster is configured such that the first belt can be used to compress a bun against the toasting surface.

16. The contact toaster for toasting bread products of claim 1, further comprising
a third belt, the third belt comprising,
a reinforcement material having a first face and a second face,
a plurality of ribs raised above the first face of the reinforcement material of the third belt, and
at least one rib raised above the second face of the reinforcement material of the third belt;
wherein the contact toaster is configured to be capable of simultaneously toasting a first food product in contact with the first belt and a second food product in contact with a third belt.

17. A contact toaster for toasting bread products comprising:

a heating zone comprising a heating element configured to contact and toast a second face of bread products; and
a first belt configured to move the bread product through the heating zone, the first belt arranged such that the first belt contacts a first face of bread products, the first belt comprising,
a reinforcement material having a first face and a second face;
a material that is at least one of coated and laminated over the first face of the reinforcement material;
a first plurality of ribs raised above the first face of the reinforcement material, the first plurality of ribs being transverse to a longitudinal direction of the first belt and being configured to impart lateral force to objects carried by the first belt; and
a second plurality of ribs above the second face of the reinforcement material, the second plurality of ribs comprising a plurality of straight ribs transverse to a longitudinal direction of the first belt;
wherein a pattern of the first plurality of ribs is different than a pattern of the second plurality of ribs; and
wherein the first belt is configured to wrap around a second belt such that a plurality of the second plurality of ribs contact the second belt.

18. The contact toaster for toasting bread products of claim 17, wherein the apparatus is a vertically oriented toasting machine.

19. The contact toaster for toasting bread products of claim 17, wherein the first belt is configured to move food products through the heating zone such that food products will slide along a stationary toasting surface such that the food product is toasted as it slides.

20. The contact toaster for toasting bread products of claim 17, wherein ribs raised above one face of the first belt are straight and parallel to each other, and ribs raised above another face of the belt are arranged in a repeating pattern that is at least one of undulating and sinusoidal.

21. The contact toaster for toasting bread products of claim 17, wherein the first plurality of ribs have a height of at least about 0.020 inches.

22. The contact toaster for toasting bread products of claim 17, wherein at least one of the first plurality of ribs and the second plurality of ribs comprise a plurality of ribs spaced apart by about 1.5 inches.

23. The contact toaster for toasting bread products of claim 17, wherein ribs of the second plurality of ribs are spaced apart differently than ribs of the first plurality of ribs.

24. The contact toaster for toasting bread products of claim 17, wherein the first belt is configured such that the first belt helps retain heat in buns and warm them to serving temperature.

25. The contact toaster for toasting bread products of claim 17, wherein the contact toaster is configured such that the first belt can be used to compress a bun against the toasting surface.

26. The contact toaster for toasting bread products of claim 17, further comprising
a third belt, the third belt comprising,
a reinforcement material having a first face and a second face,
a plurality of ribs raised above the first face of the reinforcement material of the third belt, and
at least one rib raised above the second face of the reinforcement material of the third belt;

wherein the contact toaster is configured to be capable of simultaneously toasting a first food product in contact with the first belt and a second food product in contact with a third belt.

27. A contact toaster for toasting bread products comprising:
a toasting surface configured to toast a first face of bread products; and
a first belt configured to be arranged to contact a second face of bread products and move the bread products so that they slide along the toasting surface and toast as they slide, the first belt comprising,
a reinforcement material having a first face and a second face;
a material that is at least one of coated and laminated over the first face of the reinforcement material; and
a first plurality of ribs raised above the first face of the reinforcement material, the first plurality of ribs being transverse to a longitudinal direction of the first belt and being configured to impart lateral force to objects carried by the first belt;
a second plurality of ribs above the second face of the reinforcement material, the second plurality of ribs comprising a plurality of straight ribs transverse to a longitudinal direction of the first belt;
wherein a pattern of the first plurality of ribs is different than a pattern of the second plurality of ribs; and
wherein the first belt is configured to wrap around a second belt such that a plurality of the second plurality of ribs contact the second belt.

28. The contact toaster for toasting bread products of claim 27, wherein the apparatus is a vertically oriented toasting machine.

29. The contact toaster for toasting bread products of claim 27, wherein the apparatus is configured to toast buns.

30. The contact toaster for toasting bread products of claim 27, wherein ribs raised above one face of the belt are straight and parallel to each other, and ribs raised above another face of the belt are arranged in a repeating pattern that is at least one of undulating and sinusoidal.

31. The contact toaster for toasting bread products of claim 27, wherein at least one of the first plurality of ribs has a height of at least about 0.020 inches.

32. The contact toaster for toasting bread products of claim 27, wherein the belt further comprises a lacing on at least one narrow end of the belt; and a flap on at least one narrow end of the belt.

33. The contact toaster for toasting bread products of claim 27, wherein the belt is a first belt, and comprises a second plurality of flights ribs above the second face of the reinforcement material; and further comprising the second belt arranged such that the first belt wraps around the second belt, the second face of the first belt facing the second belt.

34. The contact toaster for toasting bread products of claim 27, wherein the first plurality of ribs are formed from beads having a diameter of about one thirty-second of an inch to about one half of an inch.

35. The contact toaster for toasting bread products of claim 27, wherein the first plurality of ribs comprise wavy ribs.

36. The contact toaster for bread products of claim 35, wherein the wavy ribs are discontinuous.

37. The contact toaster for bread products of claim 35, wherein at least one of the wavy ribs has a height of at least about 0.02 inches.

38. The contact toaster for bread products of claim 35, wherein the contact toaster is a vertically oriented toasting machine.

39. The contact toaster for bread products of claim 35, wherein the wavy ribs comprise sinusoidal ribs.

40. The contact toaster for bread products of claim 35, wherein the first belt comprises lacings and a flap.

41. The contact toaster for toasting bread products of claim 27, wherein at least one of the first plurality of ribs and the second plurality of ribs comprise a plurality of ribs spaced apart by about 1.5 inches.

42. The contact toaster for toasting bread products of claim 27, wherein ribs of the second plurality of ribs are spaced apart differently than ribs of the first plurality of ribs.

43. The contact toaster for toasting bread products of claim 27, wherein the first belt is configured such that the first belt helps retain heat in buns and warm them to serving temperature.

44. The contact toaster for toasting bread products of claim 27, wherein the contact toaster is configured such that the first belt can be used to compress a bun against the toasting surface.

45. The contact toaster for toasting bread products of claim 27, further comprising
a third belt, the third belt comprising,
a reinforcement material having a first face and a second face,
a plurality of ribs raised above the first face of the reinforcement material of the third belt, and
at least one rib raised above the second face of the reinforcement material of the third belt;
wherein the contact toaster is configured to be capable of simultaneously toasting a first food product in contact with the first belt and a second food product in contact with a third belt.

46. A contact toaster for bread products comprising:
a heating element configured to toast food products;
a first belt at least of a link-type belt and a chain belt
a first rotating sprocket coupled to the first belt and configured to drive the first belt; and
a second belt configured to move food products, the second belt comprising,
a reinforcement material having a first face and a second face, the reinforcement material comprising at least one of fiberglass, nylon, polyester, aramid, polyethylene, polyolefin, polyimide, and films thereof;
at least one of a silicone rubber, a urethane rubber, and a fluoropolymer above the first face of the reinforcement material;
at least one of a silicone rubber, a urethane rubber, and a fluoropolymer above the second face of the reinforcement material;
a first plurality of ribs above the first face of the reinforcement material; and
a second plurality of ribs above the second face of the reinforcement material;
wherein the contact toaster is arranged such that,
the first rotating sprocket drives the first belt and the first belt drives the second belt;
the second belt is wrapped around the first belt such that the second face of the second belt faces the first belt;
the first face of the second belt contacts a first face of food products and the heating element toasts a second face of food products; and food products are moved such that food products will slide along a stationary toasting surface and toast as they slide; and wherein a pattern of the first plurality of ribs of the second belt is different than a pattern of the second plurality of ribs of the second belt.

47. The contact toaster for bread products of claim 46, wherein the first plurality of ribs comprise wavy ribs transverse to a longitudinal direction of the second belt.

48. The contact toaster for bread products of claim 47, wherein the second plurality of ribs comprise straight ribs transverse to a longitudinal direction of the second belt.

49. The contact toaster for bread products of claim 46, wherein the second belt is configured to help retain heat in food products and warm them to serving temperature.

\* \* \* \* \*

UNITED STATES PATENT AND TRADEMARK OFFICE
CERTIFICATE OF CORRECTION

PATENT NO. : 7,278,350 B2  Page 1 of 1
APPLICATION NO. : 10/796534
DATED : October 9, 2007
INVENTOR(S) : Frank M. Keese et al.

It is certified that error appears in the above-identified patent and that said Letters Patent is hereby corrected as shown below:

Column 18,
line 39, after "a first belt" insert --comprising--.

Column 18,
line 39, after "at least" insert --one--.

Column 18,
line 39, after "chain belt" insert --;--.

Signed and Sealed this

Eighteenth Day of March, 2008

JON W. DUDAS
*Director of the United States Patent and Trademark Office*